April 28, 1959  R. L. CRANE  2,883,736
BAND TYPE CUTOFF SAW
Filed Sept. 12, 1955  7 Sheets-Sheet 1

Inventor
Robert L. Crane

April 28, 1959

R. L. CRANE 2,883,736

BAND TYPE CUTOFF SAW

Filed Sept. 12, 1955

Inventor
Robert L. Crane
By
Attorney

April 28, 1959   R. L. CRANE   2,883,736
BAND TYPE CUTOFF SAW

Filed Sept. 12, 1955   7 Sheets-Sheet 5

Inventor
Robert L. Crane
By
Attorney

April 28, 1959

R. L. CRANE 2,883,736

BAND TYPE CUTOFF SAW

Filed Sept. 12, 1955

Inventor
Robert L. Crane
By
Attorney

April 28, 1959

R. L. CRANE 2,883,736

BAND TYPE CUTOFF SAW

Filed Sept. 12, 1955

Inventor
Robert L. Crane
By
Attorney

United States Patent Office
2,883,736
Patented Apr. 28, 1959

2,883,736

BAND TYPE CUTOFF SAW

Robert L. Crane, Hopkins, Minn., assignor to Continental Machines, Inc., Savage, Minn., a corporation of Minnesota Application September 12, 1955, Serial No. 533,786

1 Claim. (Cl. 29—68)

This invention relates generally to band saws and has more particular reference to band saws of the type used in cutting lengths of metal bars and the like into smaller pieces for use as required.

Band saws of this nature usually comprise a saw head assembly consisting of an endless saw band trained about a pair of pulleys or wheels mounted in the opposite end portions of an elongated housing for rotation on spaced parallel axes. One of the wheels about which the band is trained is power driven and drives the saw band through frictional engagement therewith.

In most cases the saw head assembly is supported for motion toward and from a fixed work zone in which stock to be cut is held while the cutting stretch of the saw band acts thereon.

One of the most vexing problems encountered in present day cutoff saws of this type is that slippage between the saw band and its driving wheel makes it impossible to take advantage of the full rated capacity of the saw. Such slippage occurs primarily because of the fact that the cutting stretch of the saw band is practically bathed with cutting lubricant as it enters the cutting zone and this lubricant is carried onto the face of the drive wheel by the saw band as it travels thereover. Thus there is apt to be a thin film of cutting lubricant interposed between the mating faces of the saw band and the drive wheel at all times, and a high tension on the band is necessary to maintain it tractively coupled with the drive wheel.

It is impossible, however, to safely tension the band sufficiently to overcome slippage at such times as the rate of feed of the saw through the stock approaches full rated capacity of the saw, due to the fact that the drag upon the saw band, which induces slippage, increases in proportion to the speed at which the saw band is fed into the work.

It is an object of this invention, therefore, to provide a band type cutoff saw of the character described wherein slippage between the drive wheel and the saw band trained thereon is minimized to the point where the saw can be operated at or close to rated capacity without the need for subjecting the band to dangerous degrees of tension.

More specifically, it is an object of this invention to achieve an unusually high degree of traction between the driving wheel and the saw band of a cutoff saw of the character described through the provision of a face on the drive wheel of novel configuration and which greatly reduces the area of engagement between the saw band and the drive wheel.

In this respect, it is a purpose of this invention to provide a drive wheel for a band saw of the character described wherein the area of engagement between the face of the drive wheel and a saw band trained thereover is reduced by as much as 50% from the conventional by the expedient of limiting the band to tractive engagement with a multiplicity of narrow axially spaced circumferentially disposed lands on the drive wheel. These lands function to force cutting lubricant from the band and into the circumferential grooves in the face of the drive wheel defining the lands to assure the best possible driving engagement between the wheel and the saw band.

A further object of the invention resides in the provision of a band type cutoff saw of the character described incorporating improved means for supporting the saw head assembly for translatory motion toward and from a fixed working zone at which cutting takes place.

In this connection, it is a further object of the invention to provide a band type cutoff saw wherein the saw head assembly is rigidly supported upon a single elongated guide member and is constrained to translatory motion along the length of the guide member toward and from a fixed working zone.

Still another object of this invention resides in the provision of improved means for holding stock while it is being cut by the saw and for feeding such stock into the working zone.

In this respect it is a further object of the invention to provide stock holding and feeding means which comprises a pair of vises cooperating to rigidly hold stock in position during cutting, one of said vises being mounted for bodily motion in opposite directions along a path normal to the plane of the cutting stretch of the saw band so that stock gripped by said movable vise will be fed into the working zone as a consequence of bodily motion of said movable vise toward the work zone.

Another object of this invention resides in the provision of a band type cutoff saw of the character described, the components of which are exceptionally well adapted for automatic operation.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claim.

The accompanying drawings illustrate several complete examples of the physical embodiments of the invention constructed according to the best modes so far devised for the practical application of the principles thereof and in which:

Figure 6 is an enlarged fragmentary sectional view through the rim portion of the drive wheel and taken along the plane of the line 7—7 in Figure 6;

Figure 1:
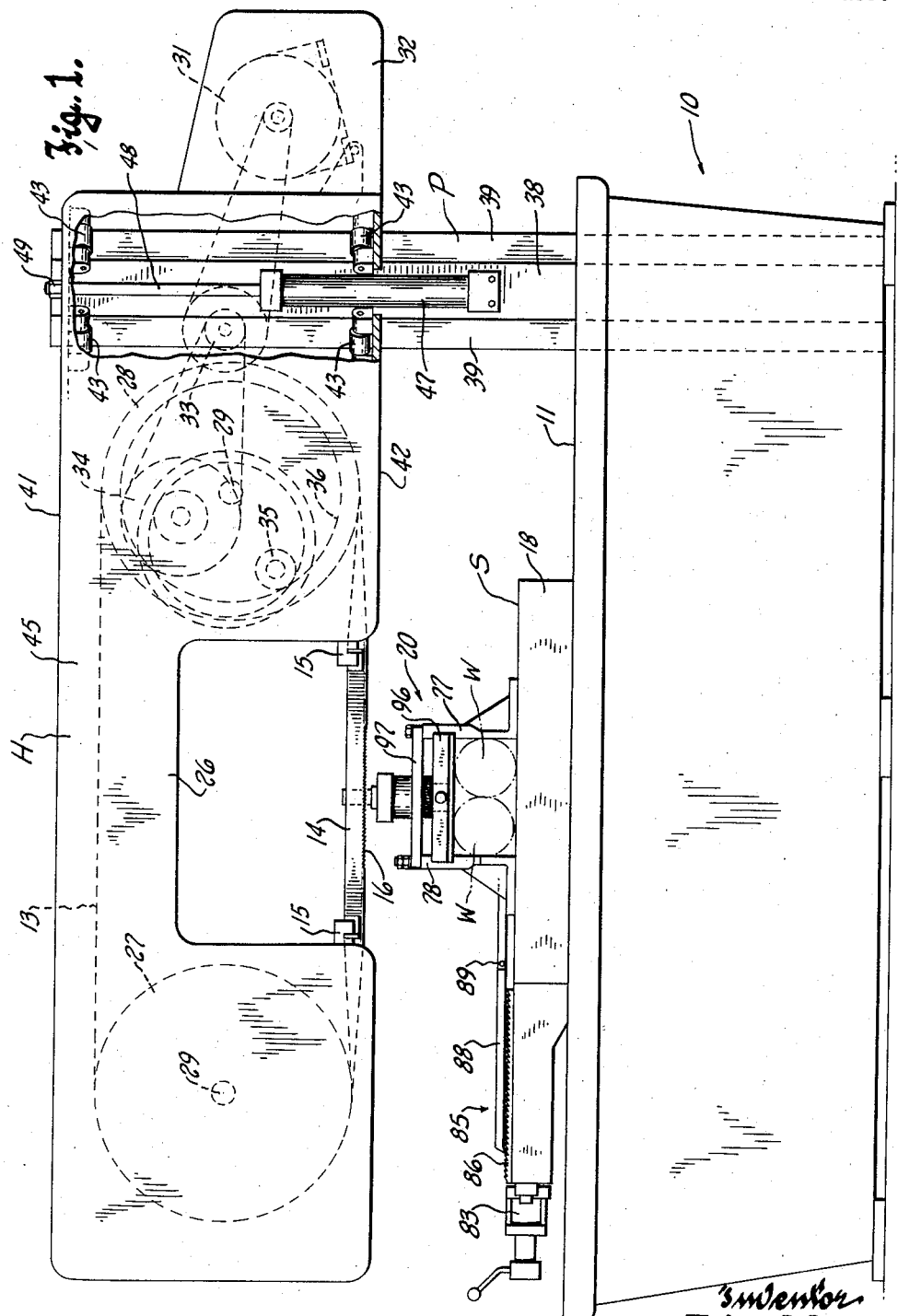
Figure 1 is a front elevational view of a band type cutoff saw embodying the principles of this invention and having parts thereof broken away to illustrate details of construction.
Figure 2:
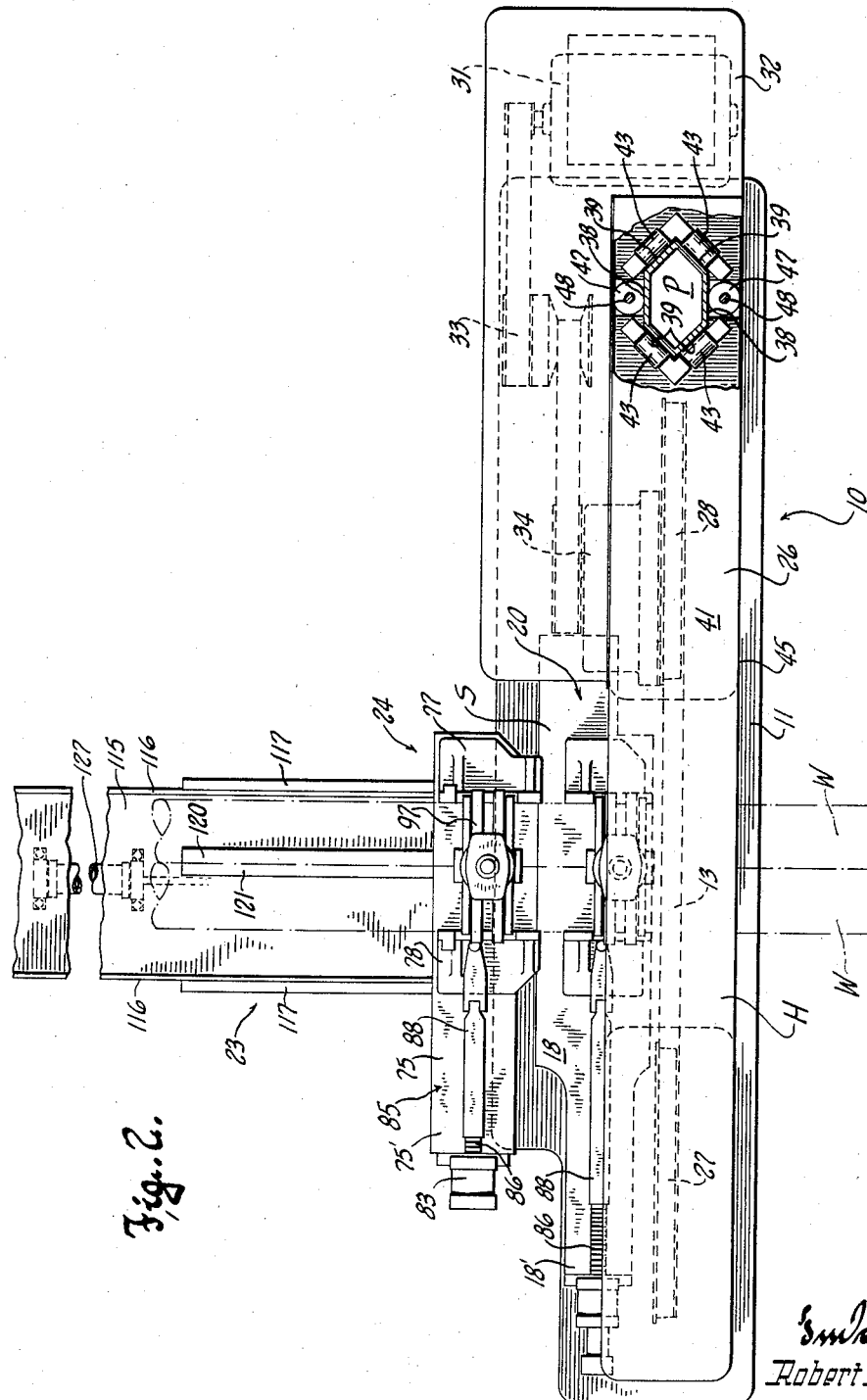
Figure 2 is a plan view of the saw shown in Figure 1 and likewise having parts thereof broken away to show details of construction.

Referring now more particularly to the accompanying drawings in which like reference characters designate like parts throughout the several views, the numeral 10 generally designates an elongated main base having a horizontal substantially trough-like top 11, and a post P rigidly anchored in one end portion of the base and projecting vertically a distance thereabove. The post P constitutes a single upright supporting and guiding member for the saw head assembly H, the latter being mounted thereon in cantilever fashion to lengthwise overlie the base 10.

As will be discussed hereinafter the saw head assembly includes an endless saw band 13 having its cutting stretch 14 constrained to travel in a horizontal path and held by guides 15 with the flat sides of the blade disposed in parallel vertical planes. The saw band has teeth 16 on one edge thereof, and the teeth on the cutting stretch 14 of the band face downwardly toward the base 10.

The saw head assembly is supported by the post P for up and down translatory motion, with downward motion of the assembly carrying the cutting stretch 14 of the saw band into cutting engagement with stock or work W held in a fixed position in a working zone directly beneath the cutting stretch of the band, between the band and the surface S of a work supporting table 18 mounted on the top of the base 10.

Stock or work W to be cut into pieces generally comprises elongated bars or shafts occupying a position generally normal to the plane of the cutting stretch of the saw band as the latter cuts through the stock. The front end portion of the stock which rests upon the surface S of the table 18 is stationarily held in a front vise 20 mounted on the table at a fixed location immediately behind the plane of the cutting stretch of the saw band. The rear portions of the stock thus held in the vise may be supported in a more or less conventional manner by a series of transverse rollers 22 mounted upon an elongated rear base 23, preferably fixed to the front base 10 and projecting rearwardly from substantially the medial zone thereof.

The base 23 also supports a rear vise 24 which cooperates with the front vise 20 to rigidly hold work or stock while it is being cut by the saw. The rear vise is mounted for bodily motion forwardly and rearwardly with respect to the front vise so that when the latter is released, work or stock gripped in the rear vise can be fed forwardly across the plane of the cutting stretch of the saw band and into the working zone to the proper position for the next cutting off operation.

The saw head assembly H follows more or less conventional construction is so far as it comprises an elongated housing 26 having the endless saw band 13 trained over a pair of wheels or pulleys 27 and 28 rotatably mounted in opposite end portions of the housing. In the present case, each of the wheels is mounted on a shaft 29 supported in bearings (not shown) carried by the housing and which constrain the wheels to rotate on parallel axes which lie in a horizontal plane normal to the post P which supports the saw head assembly. As is customary, one of the wheels 27 comprises an idler pulley for the saw band, and the other wheel 28 comprises a drive pulley for the band.

Rotation may be imparted to the drive pulley as by means of an electric motor 31 mounted on an extension 32 at the post end of the housing 26, and drivingly connected with the pulley 28 through a speed changing device 33 and a gear reducer 34, the latter having a drive pinion 35 meshing with an internal ring gear 36 on the drive pulley 28 and formed as a part thereof.

In order to afford exceptionally good rigidity in the mounting of the cutting head assembly upon the post P, it is a feature of this invention that the post, though of hollow construction, is substantially hexagonal in cross section. Two opposite parallel sides 38 of the post which are disposed in planes parallel to the long dimension of the base 10 are elongated, however, and the included angle between adjacent pairs of shorter sides 39 is decreased to substantially 90°. Consequently the apex edges of the right angle sides 39 lie in a common plane parallel to the elongated sides 38 of the hexagon and to the long dimension of the base 10.

The vertical post P is loosely received in correspondingly shaped holes in the horizontal top and bottom walls 41 and 42 of the housing of the saw head assembly, so that the latter is free to move up and down on the post. Such up and down bodily motion of the saw head assembly is very accurately guided by sets of angularly disposed rollers 43 carried by the top and bottom walls of the housing and having their peripheries intimately engaging the exterior surfaces of the shorter sides 39 of the post P. The rollers 43, of course, not only prevent sagging of the saw head assembly but positively preclude even the slightest rotational movement of the saw head assembly about the vertical axis of its supporting post.

Attention is directed to the fact that the flat upright sides 45 of the housing are disposed in parallel relationship to the elongated sides 38 of the post, and that the saw head assembly is mounted cantilever fashion on the post with both of its wheels 27 and 28 entirely to one side of the post and with the orbit of the saw band substantially in the plane containing the apex edges of the shorter sides 39 of the post. The plane containing the axes of the wheels 27 and 28 is also disposed horizontally and normal to the axis of the post.

Any suitable means may be employed for elevating and lowering the saw head assembly on the post P but, in the present case, up and down translatory motion of the saw head assembly is governed by a pair of hydraulic cylinders 47 mounted on the opposite long sides 38 of the post and having their rams 48 projecting upwardly and secured as at 49 to the top wall 41 of the saw housing. The cylinders 47 may be of the single acting type and when fluid under pressure is supplied to their lower ends, their rams are propelled upwardly to lift the entire saw head assembly and thus carry the cutting stretch 14 of the saw band away from the cutting zone. Downward feeding of the saw into and through the stock being cut may be readily accomplished by controlling the exhaust of pressure fluid from the cylinders 47, as by an adjustable bleed orifice (not shown).

While the saw head assembly described is constrained to up and down translatory motion and thus is capable of performing cutting operations in a fixed working zone only, it is possible to provide for horizontal swinging motion of the cutting head assembly in addition to such up and down translatory motion thereof to enable sawing operations to be performed at any of a number of pre-selected working zones.

Figure 8:
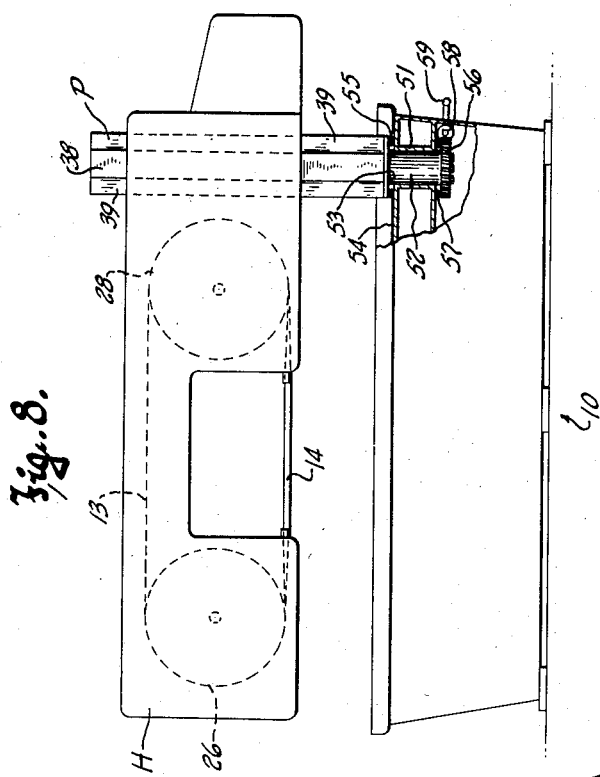
Figure 8 is a more or less diagrammatic front elevational view similar to Figure 1 but showing a modified embodiment of the invention.

Referring to Figure 8, which shows a slightly modified embodiment of the invention, it will be seen that such horizontal swinging motion of the saw head assembly may be achieved by mounting the post P on the main base 10 in a vertically elongated bearing 51 on the base, so that the post may be rotated about its vertical axis. In this case, the lower end 52 of the post is circular in cross section and reduced to define a shoulder 53 facing downwardly toward the top wall 54 of the base. A thrust bearing 55 interposed between the wall 54 and the shoulder 53 thus supports the weight of the post and allows it to turn freely in its bearing 51.

The lower extremity of the post end 52 projects downwardly beneath the bearing 51 and may have a worm wheel 56 secured thereto; and a second thrust washer 57 is preferably interposed between the upper face of the worm wheel and the lower end of the bearing 51 to preclude all possibility of up and down endwise motion of the post relative to the base 10.

A worm 58, meshing with the worm wheel, may be rotated manually as by a handle 59 so as to impart rotational movement to the post in either direction, at the same time assuring that the post will not be accidentally moved out of any position of rotational adjustment.

In all other respects, the embodiment of the invention disclosed in Figure 8 is like that shown in Figures 1 through 5.

Figure 6:
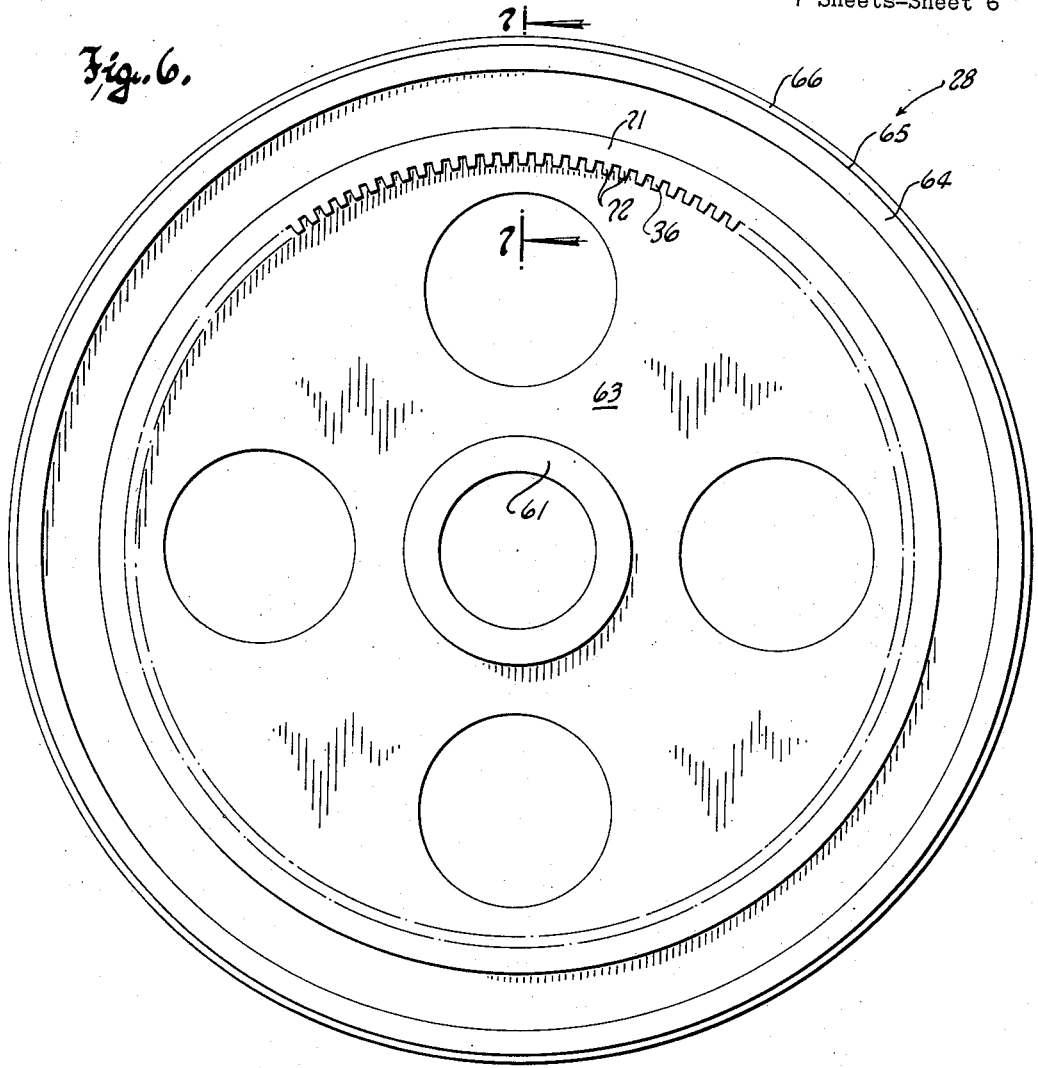
Figure 6 is an elevational view of the drive wheel per se.
Figure 7:
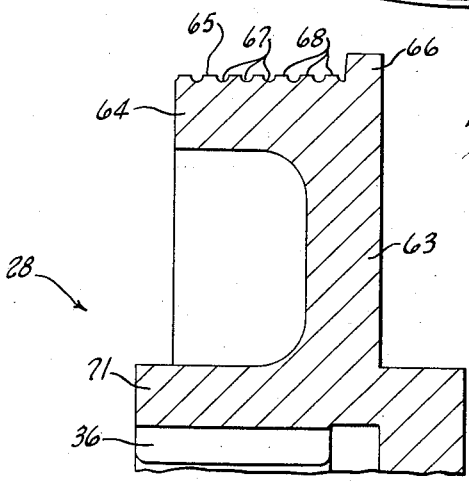

Again referring to the saw head assembly H, it should be noted that the drive wheel or pulley 28 is of special construction, as shown particularly in Figures 6 and 7; and though fully disclosed and described herein, the drive wheel is claimed in a copending divisional application, Serial No. 643,600, filed March 4, 1957. It comprises a bored hub 61 and a web 63 fixed to the hub and projecting radially therefrom substantially normal to the hub. The wheel 28 is provided with an annular rim 64 projecting axially from one face of the web, and the periphery of the rim provides a face 65 over which a saw band may be trained to be driven by the wheel. The annular rim 64 also has an annular flange 66 projecting radially outwardly therefrom substantially in line with the adjoining portions of the web 63.

It is one of the features of the drive wheel of this invention that the face 65 which is to receive the saw band has a uniform taper of not more, and usually considerably less, than 3° with the large diameter of the wheel face adjacent to the flange 66. This taper, of course, tends to cause a saw band trained over the face 65 to move toward the flange 66, and thus prevents accidental detachment of the band from the pulley.

It is a further feature of the drive wheel or pulley that the area of the face engaged by the flat side of a saw band trained thereover is reduced by as much as 50% from the conventional and this is accomplished by forming a multiplicity of axially equispaced circumferential grooves 67 in the face of the wheel to define substantially narrow lands 68 therebetween. The provision of a multiplicity of axially spaced narrow lands upon which one flat face of the saw band rides as it is driven by the pulley 28 affords a far better frictional driving connection between the face of the pulley and the saw band than was possible heretofore.

The slippage which inevitably resulted in the past due to the presence of cutting lubricant on the saw band is thus largely overcome by the narrow lands on the pulley face. These lands have the peculiar property of being able to press against the mating face of the saw band with sufficient localized pressure as to force lubricant therefrom into the grooves between the lands. It has been found in practice that when the face of the drive wheel is formed as described, slippage between the band and the grooved face of the wheel is greatly minimized and even prevented, despite the fact that sawing may be taking place at or near maximum rated capacity of the saw.

Another feature of the drive wheel or pulley 28 resides in the fact that it is provided with an internal ring gear 36, preferably but not necessarily integral therewith. The ring gear 36 is provided by an annular flange 71 projecting axially from the web 63 at a location inside the rim 64 of the wheel but radially spaced from the rim and concentric thereto. The teeth 72 of the ring gear are adapted to mesh with the driving pinion 35 in the manner shown in Figure 1.

Again referring to the vise structures 20 and 24 shown in Figures 1 to 5, inclusive, it will be recalled that the front vise 20 is mounted in a fixed position on the work table 18 and located directly adjacent to the working zone, immediately behind the plane of the cutting stretch 14 of the saw band. The rear vise 24 is identical to the front vise 20 except that it is mounted on a carriage 75 supported on the rear base 23 for bodily back and forth motion toward and from the front vise. The upper surface of the carriage 75 lies in the plane of the work supporting surface S on the table 18, and both the work table and the carriage 75 are provided with lateral extensions 18' and 75' projecting in a direction away from the post P.

Inasmuch as the front and rear vises are identical, the following description of the rear vise 24 applies to both. The rear vise comprises a stationary jaw 77 mounted on the upper face of the carriage 75 and facing away from the post P, and it is always in alignment with the stationary jaw of the front vise. Opposite to and cooperating with the stationary jaw 77 is a movable jaw 78, also mounted on the upper surface of the carriage. The movable jaw 78 is constrained to reciprocatory motion toward and from the stationary jaw along a path parallel to the plane of the cutting stretch 14 of the saw band. For this purpose, the jaw 78 may have a narrow keel 79 fixed to the underside thereof and slidingly received in an elongated upwardly opening slot 80 in the carriage. The slot 80 also opens downwardly into a wider slot 81 in the underside of the carriage. A retaining plate 82 in the wider slot and secured to the underside of the keel 79 thus cooperates with the latter to constrain the jaw to bodily reciprocatory motion toward and from the stationary jaw 77.

While the movable jaw 78 may be manually moved toward the stationary jaw 77 to effect gripping of stock to be cut therebetween, a single acting hydraulic cylinder 83 is preferably provided to effect such clamping motion of the movable jaw. The cylinder is mounted on the outer end of the carriage extension 75' and the motion of its plunger 84, during extension of the plunger, is translated into clamping motion of the movable jaw 78 (toward the stationary jaw) through a quick release mechanism 85.

This quick release mechanism comprises an elongated bar 86 horizontally disposed on the carriage extension and constrained to reciprocatory motion toward and from the stationary jaw by any suitable means. The plunger 84 bears directly upon the outer end of this bar.

Endwise sliding motion of the bar 86 produced by extension of the plunger of cylinder 83 is translated into clamping motion of the movable jaw 78 of the vise through a pawl 88 having one end engaged with ratchet teeth on the upper face of the bar and its other end pivotally connected as at 89 to a part on the base of the jaw 78. This ratchet connection enables the movable jaw 78 to be quickly manually moved to a position close to or lightly engaging stock between the jaws, and at which position final clamping motion may be imparted to the movable jaw by a relatively small extension of the plunger 84 of the hydraulic cylinder. However, when the outer end of the pawl is swung upwardly from engagement with the ratchet teeth, the movable jaw 78 is free to be moved manually away from the stationary jaw to thus facilitate loading of stock to be cut into the vise.

It will be noted that hydraulic actuation of the ratchet bar 86 is yieldingly resisted by a compression spring 91 confined between opposing abutments on the bar and the carriage 75. The spring, therefore, serves to effect retraction of the bar and the plunger 84 when pressure fluid in the cylinder is released by a suitable control valve (not shown).

If automatic controls are provided to periodically effect the back and forth motion of the carriage 75 necessary to feed predetermined lengths of stock into the working zone by the rear vise 24, it will be necessary to stop such feeding motion of the carriage when the stock being cut is used up. This function can be performed by a limit switch 93 mounted on the carriage 75 to be actuated by an adjustable stop 94 on the ratchet bar 86 as a consequence of the abnormal amount of hydraulically produced travel of the bar resulting from closure of the jaws of the rear vise when there is no stock in position to be gripped thereby.

In most instances the cooperating stationary and movable jaws 77 and 78 are all that are required to satisfactorily hold the stock or work to be cut. There are times, however, as when a group of bars or shafts are to be cut simultaneously that an upper jaw 96 for each vise must be used in conjunction with the jaws 77 and 78 to hold the stock firmly in place on the work supporting surfaces. The upper jaw 96, of course, must not interfere with the gripping of the stock by the stationary and movable jaws 77 and 78, and for this purpose it is suspended for up and down motion from a crosspiece or bridge 97 which spans the space between the stationary and movable jaws and is supported on their upper ends.

The bridge 97 has a medial portion 98 provided with a central vertical bore 99 therein, and its opposite end portions are bifurcated to provide spaced arms 100. The arms rest on the upper ends of the jaws 77 and 78 and loosely embrace screws 101 which are threaded downwardly into the upper ends of the jaws. The bifurcated ends of the bridge permit whatever relative motion is necessary between the jaws 77 and 78 to clampingly engage them with stock to be cut, and also provide for centering of the upper jaw with respect to the stock held between the jaws 77 and 78. The screw 101 of the stationary jaw may be tightened to clamp the adjacent end of the bridge thereto, while lock nuts 102 on the other screw may be adjusted to snugly but slidably hold the opposite end of the bridge in engagement with the top of the movable jaw. Thus, the bridge does not interfere with clamping and/or releasing motion of the movable jaw 78.

While the upper jaw 96 may be forced downwardly into clamping engagement with stock in the bite of the jaws 77 and 78 by conventional mechanical means, it is hydraulically operated in the present case by the plunger 104 of a single acting hydraulic cylinder 105. The cylinder comprises a short length of tubing endwise confined between the upper face of the medial portion 98 of the bridge 97 and an end cap 106 thereabove connected to the bridge by screws 107. The plunger 104 is also tubular and projects downwardly through the bore 99 in which it is slidingly received to have a nut 108 rotatably mounted on its lower end. The nut, however, is restrained against axial motion relative to the plunger.

A plunger return spring 109 in the cylinder and surrounding the plunger biases the same upwardly to a retracted position defined by its engagement with the underside of the end cap 106.

The upper jaw 96 occupies a position beneath the nut 108, and is mounted on the lower end of a post 110 which is threaded in the nut but slides freely up and down in the hollow interior of the plunger. Thus whenever fluid under pressure is introduced into the upper end of the cylinder, the plunger is forced downwardly thereby against the bias of its return spring 109 to carry the post and the jaw 96 downwardly with it into clamping engagement with stock embraced by the jaws 77 and 78.

It should be observed that only a short stroke of the piston 104 is necessary to effect proper clamping engagement between the upper jaw 96 and the stock, for the upper jaw is quickly adjustable to any position close to the stock to be clamped in the vise by manual rotation of the nut 108 on the lower end of the plunger.

Up and down motion of the upper jaw 96 is guided by the jaws 77 and 78 to assure against rotational movement of the upper jaw about the axis of the post 110 upon which it is mounted. For this purpose, the upper jaw has opposite bifurcated end portions the bifurcations 112 of which slidingly embrace the narrower upper portions of the jaws 77 and 78 and are accommodated in substantially deep upwardly opening clearance notches 113 in the wider lower portions of the upright jaws.

In the event the upper jaw 96 is not needed and stock can be properly held in position upon the work supporting surfaces of the table 18 and the carriage 75, the entire upper jaw assembly can be quickly removed merely by detachment of the screws 101 from the upper ends of the jaws 77 and 78.

The hydraulically operated front vise and clamp down structure herein shown and described, forms the subject of and is claimed in the copending application of Robert L. Crane, Charles E. Cleland and Charles H. Whitmore, Serial No. 772,256, filed November 6, 1958, as a division of a copending application Serial No. 696,502, filed November 14, 1957, which latter application is a continuation-in-part of this application.

Figure 3:
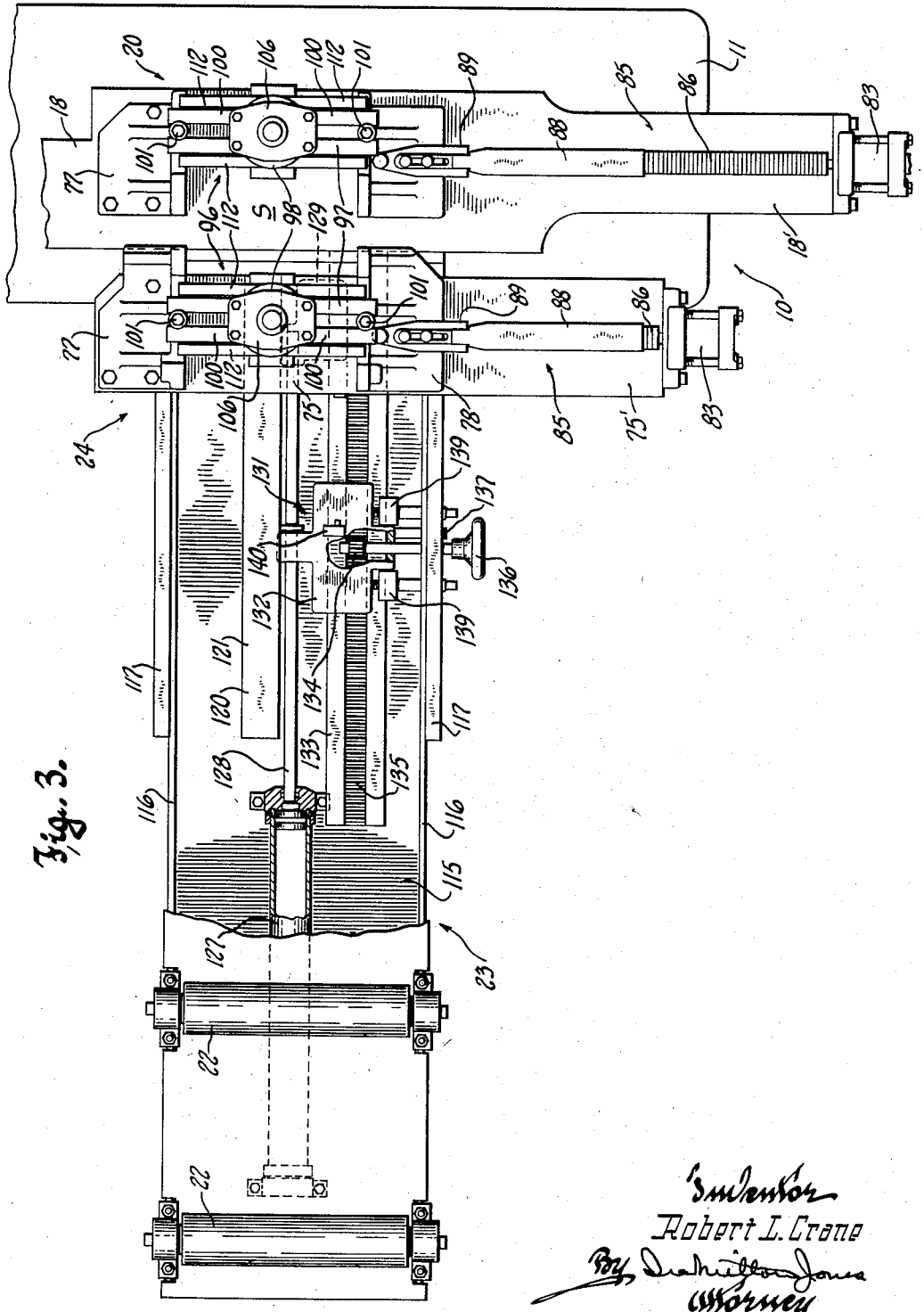
Figure 3 is an enlarged plan view of the stock holding and advancing means, parts thereof being broken away and shown in section.
Figure 4:
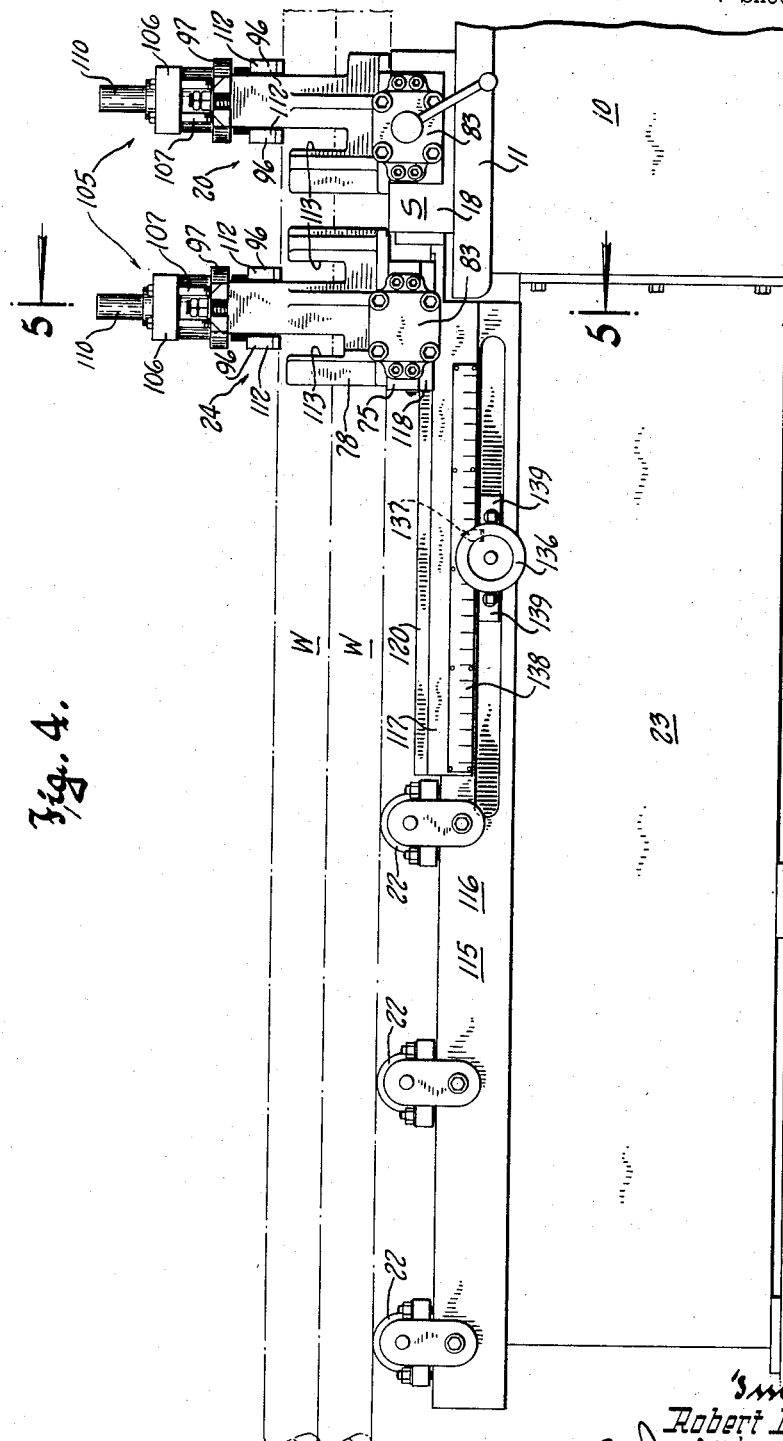
Figure 4 is an elevational view of the stock holding and advancing means shown in Figure 3.
Figure 5:
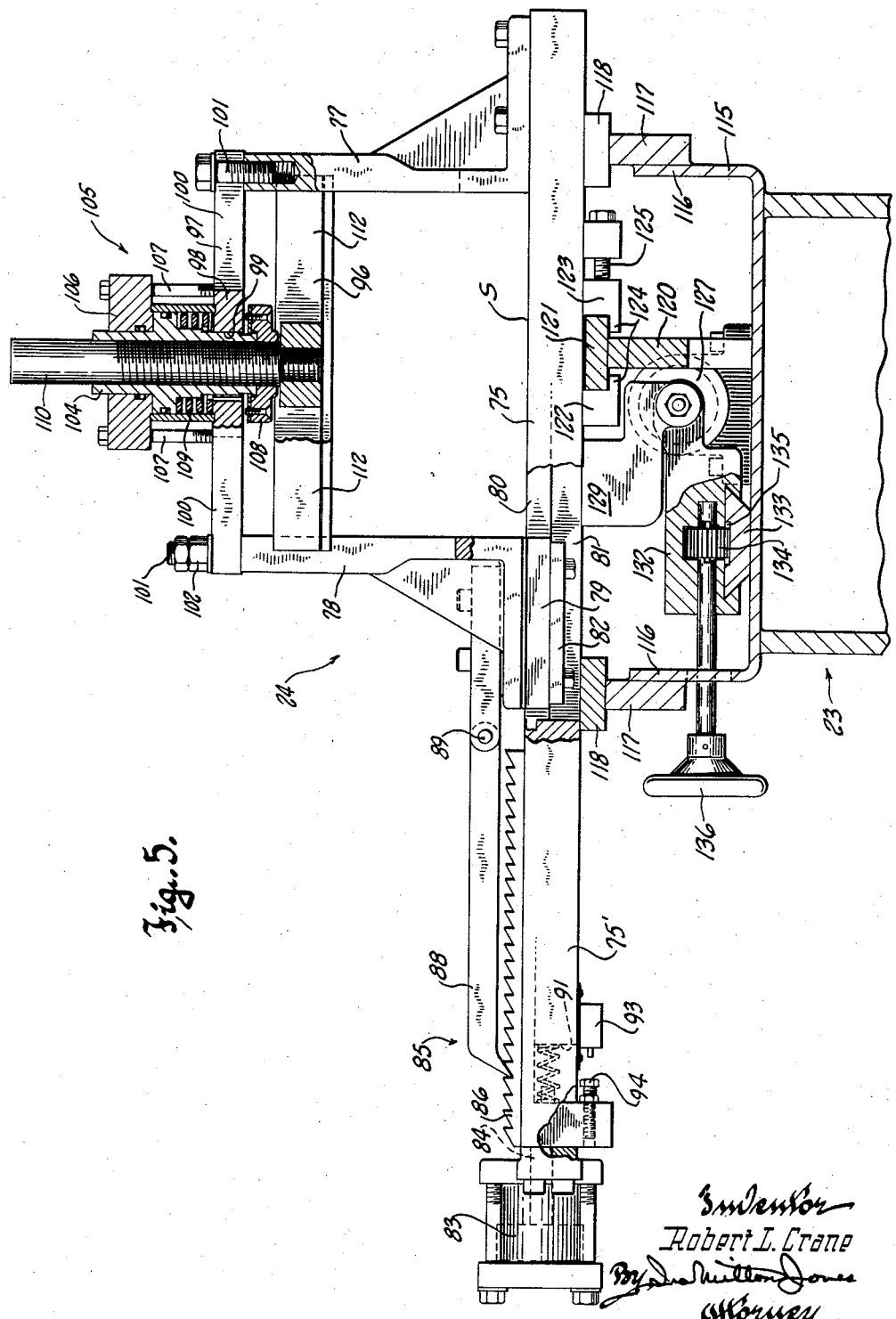
Figure 5 is a sectional view taken along the line 5—5 of Figure 4.

As stated previously, the carriage 75 upon which the rear vise 24 is mounted, is supported by the rear base 23 by means which constrains the carriage to horizontal translatory motion toward and from the front vise 20. Referring to Figures 3 and 5 particularly, it will be observed that the top of the rear base has a channel 115 fixed thereto with the flanges 116 of the channel projecting upwardly and extending lengthwise of the rear base. Each flange has a horizontal rail 117 fixed to its upper end portion, and slide bars 118 attached to the underside of the carriage rest on these rails to slidingly support the carriage on the base with the carriage spaced above the web of the channel.

Intermediate the flanges 116 the channel also has a guide rail 120 fixed thereto and projecting upwardly toward the underside of the carriage. The guide rail is substantially T-shaped in cross section and has its head 121 closely underlying the carriage and extending horizontally lengthwise of the rear base so as to be disposed substantially normal to the plane of the cutting stretch 14 of the saw band. Guide blocks 122 and 123 mounted on the carriage at its underside slidingly embrace the opposite longitudinal edges of the head 121 on the guide rail, and these blocks are provided with opposing ledges 124 engaging under the head 121 to hold the carriage on the rails 117 and to constrain the carriage to translatory motion toward and from the front vise 20. One of the guide blocks 122 is preferably fixed on the carriage, while the other block 123 is adjustable toward and from the adjacent side edge of the head 121, as by means of an adjustment screw 125 on the carriage.

Back and forth motion is imparted to the carriage 75 by means of a long stroke double acting hydraulic cylinder 127 mounted on the rear base between and parallel to the flanges 116 of the base channel. The plunger 128 of the cylinder projects forwardly beneath the carriage, directly alongside the guide rail thereof, and has its extremity anchored in a bracket 129 on the underside of the carriage.

During sawing the carriage preferably, but not necessarily, occupies a predetermined forward operative position disposing the vise 24 thereon closely adjacent to the front vise. This position may be determined by the plunger of cylinder 127 when the plunger is fully extended and at its forward limit of travel. Rearward motion of the carriage, of course, is also limited by the magnitude of the retraction stroke of the plunger 128.

It is a feature of the apparatus of this invention, however, that rearward motion of the carriage and the vise thereon may be halted at any point between the limits of back and forth motion of the carriage. For this purpose an adjustable stop mechanism 131 is provided, located generally behind the carriage 75 and nested in the channel 115 between the plunger 128 of the cylinder and the adjacent flange of the channel.

The adjustable stop mechanism comprises a slide 132 mounted on an elongated way 133 and constrained thereby to back and forth motion in a path parallel to the path of motion of the carriage. For ease of back and forth adjustment, the slide rotatably carries a pinion 134 which meshes with rack teeth 135 on the upper face of the way, and a readily accessible hand wheel 136 on the pinion shaft enables the slide to be moved to any desired position along the length of the way.

A pointer 137 on the slide also cooperates with a scale 138 fixed on the adjacent channel flange to indicate the exact position of the slide and the point at which rearward motion of the carriage 75 is to be arrested. Wedge blocks 139 on the slide may be tightened upon the way 133 after the slide has been adjusted so as to securely lock the slide in its adjusted position.

If desired, a mechanical stop may be fixed on the slide for engagement by the carriage during rearward translation thereof by its hydraulic cylinder to thus limit the rearward travel of the carriage 75 and the vise thereon. In that case, the four-way control valve (not shown) for the double acting cylinder 127 might be of a well-known type which automatically returns to neutral position as a consequence of the rise in pressure occasioned by interference with the retraction and extension strokes of the plunger 128 of the cylinder.

In the present case, the stop carried by the slide 132 comprises a limit switch 140 positioned to be engaged and actuated by a part on the carriage during rearward travel thereof. When thus actuated, the retraction stroke of the plunger 128 is halted by the limit switch acting through control instrumentalities (not shown) which also automatically govern extension of the plunger after it has been stopped in this manner.

It will be understood that such control instrumentalities may be part of a control system which automatically governs the entire operation of the apparatus, including raising and lowering of the saw head assembly by its hydraulic cylinders 47, clamping and releasing of work or stock in the vises by their cylinders 84 and 105, and hydraulically produced forward and rearward travel of the carriage 75. It will also be appreciated that the control system could function to successively operate the various components of the apparatus. For instance, the control system could be set into operation as a consequence of downward travel of the saw head assembly to a lower limit at which the saw band has just completed its cut, to initiate upward retraction of the saw head assembly by its cylinders 47 and to effect release of the rear vise followed by rearward retraction of the rear vise carriage by cylinder 127, to thereafter effect closure of the rear vise upon the stock at the rear limit of travel of the carriage, release of the jaws of the front vise from the stock, forward motion of the carriage to advance stock gripped by the rear vise into the working zone, reclosure of the jaws of the front vise, and, finally, descent of the saw head assembly to bring the saw into cutting engagement with stock thus advanced into the working zone.

With such automatic operation of the apparatus, long lengths of stock may be cut into smaller pieces of an equal length determined by the setting of the adjustable stop mechanism 131. If the stock is to be sawed into pieces having greater length than the maximum stroke of the carriage cylinder 127, it will be apparent that some type of indexing recycling mechanism could easily be provided to effect repetition of the back and forth motion of the rear vise carriage two or more times in order to achieve one feeding operation. This, of course, would involve setting of the adjustable stop mechanism 131 at a dimension on the scale 138 constituting a multiple of the desired length of the pieces to be cut.

Figure 9:
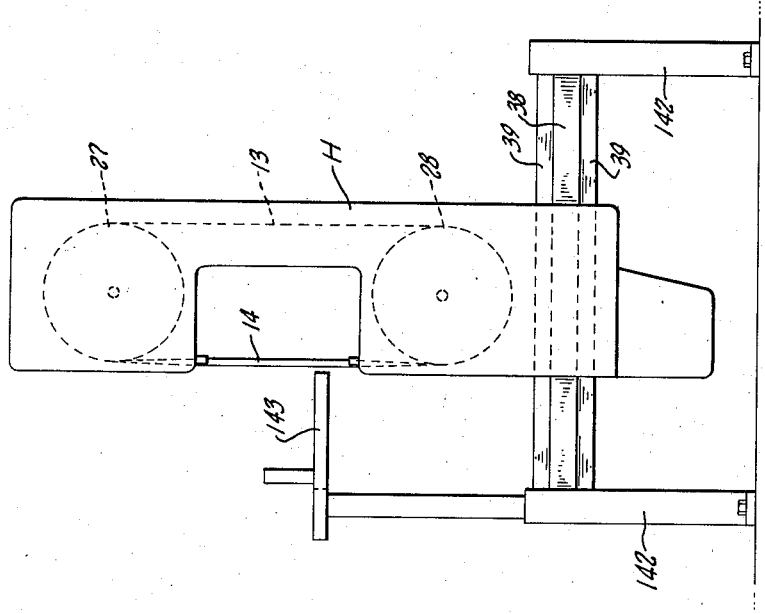
Figure 9 is a front elevational view more or less diagrammatically illustrating another embodiment of the invention.

While the saw head assembly is preferably mounted cantilever fashion on a vertical post P with the assembly extending horizontally from the post, this disposition of the post is not essential at all times. Referring to Figure 9 which illustrates a modified embodiment of the invention, it will be seen that the ends of post P can be supported upon bipod legs 142 which rigidly hold the post in a horizontal position with the elongated sides 38 of the post disposed in vertical planes. This, of course, disposes the saw head assembly in a vertical position with the cutting stretch 14 of the saw band located a distance above the post and with its cutting edge facing a work supporting table 143 carried by one of the legs 142.

From the foregoing description taken together with the accompanying drawings, it will be readily appreciated by those skilled in the art that the band saw of this invention features an improved arrangement of its components as well as novel work holding and advancing means; and that this invention provides a drive wheel for the saw band which has as its outstanding characteristics an anti-slip face and a ring gear formed integrally with the wheel.

What I claim as my invention is:

In an endless band-type cutoff saw: an elongated base; a horizontal work supporting table on the medial portion of the base; a post mounted on and projecting vertically upward from the base near one end thereof and at a distance from the work supporting table, said post being substantially hexagonal in cross section and having diametrically opposite symmetrical sides which are V-shaped in cross section and have their apex edges projecting outwardly in opposite directions and lying in a common median plane containing the longitudinal axis of the post; an elongated saw head of inverted U-shaped formation slidably mounted at one end thereof, cantilever fashion, on the vertical post for translatory up and down motion; a pulley journalled on each leg of the inverted U-shaped saw head; an endless saw band trained over the pulleys and having an upper stretch and a lower stretch, both of which travel horizontally, the lower stretch spanning the distance between the legs of the U-shaped saw head and providing the cutting stretch of the saw band; means on said legs guidingly engaging the lower stretch of the saw band and holding it with its sides exactly vertical and its cutting edge facing downward towards the work supporting table; means on the saw head coacting with the V-shaped diametrically opposite sides of the post to hold the saw head, as it moves up and down on the post, against deviation from a position at which the vertical sides of the saw band are parallel with said median plane; means to grip and advance work to be cut, onto the table, said means comprising a rear vise, and means on the base slidably mounting and constraining said rear vise to back and forth movement along a horizontal path exactly normal to said median plane; and a front vise mounted on the work supporting table to grip and hold the work advanced thereto by the rear vise.

References Cited in the file of this patent

UNITED STATES PATENTS

| | | |
|---|---|---|
| 114,710 | Richards | May 9, 1871 |
| 2,369,451 | Furtwangler | Feb. 13, 1945 |
| 2,525,712 | Neighbour | Oct. 10, 1950 |
| 2,546,116 | West et al. | Mar. 20, 1951 |
| 2,602,987 | Wells | July 15, 1952 |
| 2,669,261 | Bowers et al. | Feb. 16, 1954 |
| 2,706,502 | Fink et al. | Apr. 19, 1955 |